United States Patent
Ambati et al.

(10) Patent No.: US 9,992,223 B2
(45) Date of Patent: Jun. 5, 2018

(54) FLOW-BASED ANTI-REPLAY CHECKING

(71) Applicants: Vamsi K. Ambati, Fremont, CA (US);
Srinivasa R. Addepalli, San Jose, CA (US)

(72) Inventors: Vamsi K. Ambati, Fremont, CA (US);
Srinivasa R. Addepalli, San Jose, CA (US)

(73) Assignee: NXP USA, Inc., Austin, TX (US)

(*) Notice: Subject to any disclaimer, the term of this patent is extended or adjusted under 35 U.S.C. 154(b) by 73 days.

(21) Appl. No.: 14/664,549

(22) Filed: Mar. 20, 2015

(65) Prior Publication Data
US 2016/0277358 A1    Sep. 22, 2016

(51) Int. Cl.
*H04L 29/06* (2006.01)

(52) U.S. Cl.
CPC ...... *H04L 63/1466* (2013.01); *H04L 63/0272* (2013.01); *H04L 63/0428* (2013.01); *H04L 63/164* (2013.01)

(58) Field of Classification Search
CPC .............. H04L 63/0272; H04L 12/4641
See application file for complete search history.

(56) References Cited

U.S. PATENT DOCUMENTS

| | | | |
|---|---|---|---|
| 7,600,131 B1 | 10/2009 | Krishna et al. | |
| 8,191,134 B1 | 5/2012 | Thangavelu | |
| 8,474,034 B2 | 1/2013 | Zhang et al. | |
| 9,246,876 B1* | 1/2016 | Melam | H04L 63/0272 |
| 2014/0157365 A1* | 6/2014 | Janakiraman | H04L 47/28 |
| | | | 726/3 |

FOREIGN PATENT DOCUMENTS

| | | |
|---|---|---|
| WO | 2007091758 | 8/2007 |
| WO | 2012097614 | 7/2012 |

* cited by examiner

*Primary Examiner* — Izunna Okeke

(57) ABSTRACT

This disclosure describes an approach to detect replay attacks while having multiple cores in a multi-core processor manage an established tunneling session. The tunneling session includes a number of flows. One of the cores is assigned to manage one of the flows, and another core is assigned to manage another of the flows. A replay attack over the tunneling session is inhibited by maintaining a flow-based sequence context at each of the flows, and the flow-based sequence context is maintained by the core that is managing the respective flow.

15 Claims, 11 Drawing Sheets

FLOW-BASED ANTI-REPLAY CHECKING

TECHNICAL FIELD

The present disclosure relates to distributing packets to various cores in a multi-core processor and maintaining sequence number contexts to prevent replay attacks.

BACKGROUND

Many plain traffic flows (5 tupple) can be secured under the hood of one Internet Protocol Security (IPSec) tunnel. Tunnel mode is used to create virtual private networks for network-to-network communications (e.g. between routers to link sites), host-to-network communications (e.g. remote user access) and host-to-host communications (e.g. private chat). In tunnel mode, the entire IP packet is encrypted and/or authenticated. It is then encapsulated into a new IP packet with a new IP header.

IPSec secures the plain packet by encapsulating with a security header. IPSec protocol mandates a monotonically increasing sequence number to be present in the security header of every packet that uses the IPSec tunnel. The granularity of the sequence number is per tunnel but not at flow granularity. The sender generates this sequence number for every packet and the receiver maintains a sequence number sliding window for each tunnel. Packets with the sequence numbers that are lower than the current sequence window are dropped by the receiver as a method of preventing a replay attack. The protocol allows packets with sequence numbers that fall within the sequence window or to the right side of (i.e., greater than) the sequence window.

The sequence number checking performed in an anti-replay protocol forces serialization of the packet processing. Such serialization degrades throughput performance in the case of shared memory multi core systems or distributed cluster packet processing environments where packets cannot be effectively distributed to all of the processing units since the sequence numbers are read and updated on per packet basis.

In case of multi core environments, maintaining the integrity of the sequence number value results in taking locks to serialize the packet processing which results in a reduction of the overall throughput. In the case of non memory shared cluster systems, maintaining the integrity of the sequence number is even more difficult since the state actually need to traverse memory boundaries.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

This disclosure describes an approach to detect replay attacks while having multiple cores in a multi-core processor manage an established tunneling session. The tunneling session includes a number of flows. One of the cores is assigned to manage one of the flows, and another core is assigned to manage another of the flows. A replay attack over the tunneling session is inhibited by maintaining a flow-based sequence context for each of the flows, and the flow-based sequence context is maintained by the core that is managing the respective flow. This approach results in parallelizing the inner flow packet processing of the Internet Protocol Security (IPSec) tunnel and thereby linearly increase the IPSec performance in a multi core system or non memory shared multi core systems in the context of single IPSec Tunnel deployments. In one embodiment, negotiation between the sending system and receiving system is performed by using the Internet Key Exchange (IKE) protocol. In one embodiment, a list of packet match fields used to identify a flow context is exchanged between the sending system and the receiving system. In one embodiment, flow timeout negotiation is performed based on the type of flow.

Figure 1:
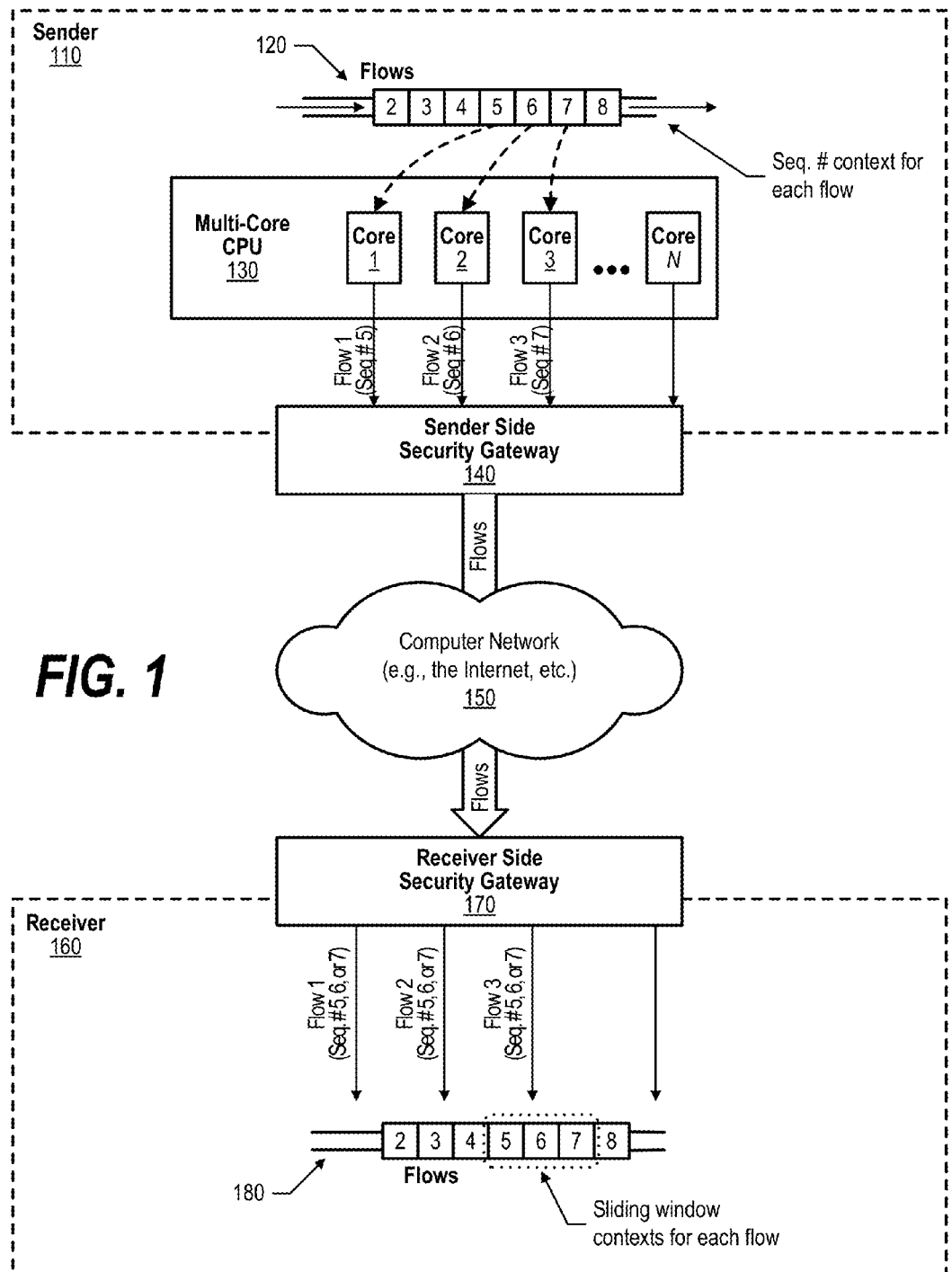
FIG. 1 is a diagram depicting one example of a flow between a sender and a receiver utilizing a sliding window context for each flow.

FIG. 1 is a diagram depicting one example of a flow between a sender and a receiver utilizing a sliding window context for each flow. Sender 110 transmits packets to receiver 160 via computer network 150, such as the Internet. A tunneling session is established between sender system 110 and receiver system 160. Both sender system 110 and receiver system 160 can utilize multi-core processors. As shown, sender system 110 is operated by multi-core CPU 130 and receiver system 160 is operated by another multi-core processor.

Once the tunneling session is established, a number of flows are transmitted between sender system 110 and receiver system 160 with each of the flows transmitting a data packet. To prevent replay attacks, a flow-based sequence context is maintained. The flow-based sequence context includes a flow-based sequence number. Prior to the final establishment of the tunneling session, a negotiation takes place between sender system 110 and receiver system 160. The negotiation establishes the use of the flow-based sequence context and may also identify fields within the packet header that are used to communicate the flow-based sequence context, including the flow-based sequence number. Flow 120 represents a flow of packets that are being transmitted from sender 110 to receiver 160 with corresponding flow-based sequence numbers shown in the flow (e.g., flow sequence number 5 currently being transmitted, etc.). Flow 120 is a single flow and, as shown, each of the packets and flow sequence numbers are managed by the same core within the sender's multi-core CPU (e.g., core #1, etc.).

When a flow is initiated, the flow-based sequence number is initialized, such as to zero or one. On the sender side, a dispatcher determines which of the cores should be assigned to the initiated flow. The dispatcher can use any method commonly used to dispatch work to cores, such as a round-robin approach, current core usage, and the like. In one embodiment, packet fields are extracted from the plain packet that is being transmitted and a hash of packet fields is performed to identify one of the cores to which the flow is assigned by the dispatcher. Once a flow is assigned to a core, subsequent packets in the flow are also assigned to the same core so that the assigned core can maintain the flow-based sequence context and properly increment the flow-based sequence number for the flow. In accordance with the negotiation performed between the sender and the receiver, a distribution label is added to the packet. In one embodiment, a new IP option of an outer IP header is used to carry the distribution label to the sender. Sender side security gateway 140 encrypts the packet according to the established tunneling protocol.

On the receiving side, receiver 160 receives the packet at receiver side security gateway 170 and decrypts the packet according to the established tunneling protocol. The receiver dispatcher determines whether the packet that was received represents a new flow or is a subsequent packet for a flow that has already been initiated. In one embodiment, this determination is made by evaluating the distribution label extracted from the packet header data and checking whether the distribution label is new to the receiver or has previously been seen by the receiver. Flow 180 represent a flow of packets that are being transmitted from sender 110 to receiver 160 with corresponding flow-based sequence numbers shown in the flow (e.g., flow sequence number 5 currently being transmitted, etc.).

In one embodiment, packet fields are extracted from the plain packet that is being transmitted between sender 110 and receiver 160 and a hash of selected packet fields is performed to identify one of the cores to which the flow is assigned by the dispatcher. However, because the number of cores utilized at the sender and receiver processors may be different, the hash may result in the flow being handled by a different core at the receiver than is handling the same flow at the sender. For example, a flow may be assigned to core #1 at the sender and assigned to core #2 at the receiver. Again, similar to the sender, once a flow is assigned at the receiver to a particular core, that same core continues to handle subsequent packets of the flow until the flow is terminated.

At the receiver, the assigned core checks for a replay attack by evaluating the flow-based sequence context including the flow-based sequence number. In one embodiment, to accommodate legitimate packets arriving out of order, a sliding window is maintained for the flow-based sequence context so that flow-based sequence numbers falling within the range of the sliding window are accepted. However, packets with flow-based sequence contexts falling outside the sliding window are deemed to be a replay attack attempt and such packets are discarded by the receiving system. For example, flow 180 represents a flow of packets that are being received by receiver 160 from sender 110 with corresponding flow-based sliding window context shown in the flow. In the example, the sliding window context allows flow-based sequence numbers of 5, 6, or 7. Therefore, the flow sequence number transmitted by the sender (seq. no. 5) falls within the sliding window and would be accepted. A packet with a sequence number falling outside the sliding window context would be discarded. Flow 180 depicts a single flow and, as shown, each of the packets and flow sequence numbers are managed by the same core within the receiver's multi-core CPU (e.g., core #3, etc.).

Figure 2:
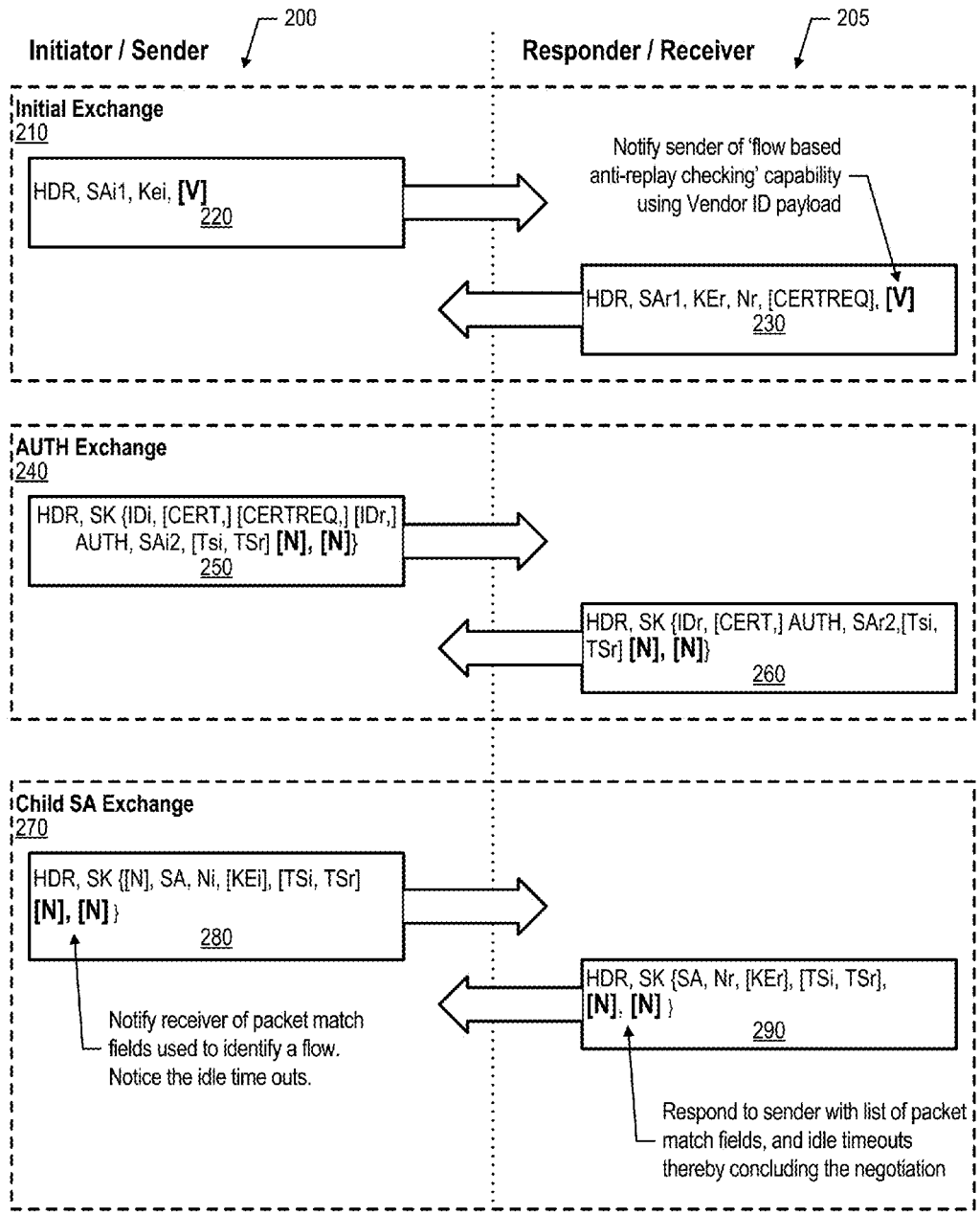
FIG. 2 is a diagram depicting examples negotiation between the sender and the receiver to enable the sliding window context for each flow.

FIG. 2 is a diagram depicting examples negotiation between the sender and the receiver to enable the sliding window context for each flow. Negotiation messages between initiator 200 and responder 205 are shown. During initial exchange 210, the initiator sends packet 220 to the responder. Part of packet 220 indicates that the initiator is capable of using flow-based anti-replay checking. In one embodiment, the Vendor Identification (Vendor ID) field is used to indicate this capability, as noted with the [V] in packet 220. Responder responds by sending packet 230 that also indicates the responder's capability of handing flow-based anti-replay checking. Again, the vendor identification field, indicated by the [V] in the figure, is used to convey the responder's capability.

Authentication exchange 240 is performed with initiator sending packet 250 to the responder and the responder responding with packet 260. Child security association (SA) exchange 270 is next performed with initiator sending packet 280 to the responder and the responder responding with packet 290. In one embodiment, during the child SA exchange, the initiator notifies the responder of the packet match fields that the initiator will use to identify a flow. Likewise, the responder sends the list of packet match fields back to the initiator in packet 290.

Figure 3:
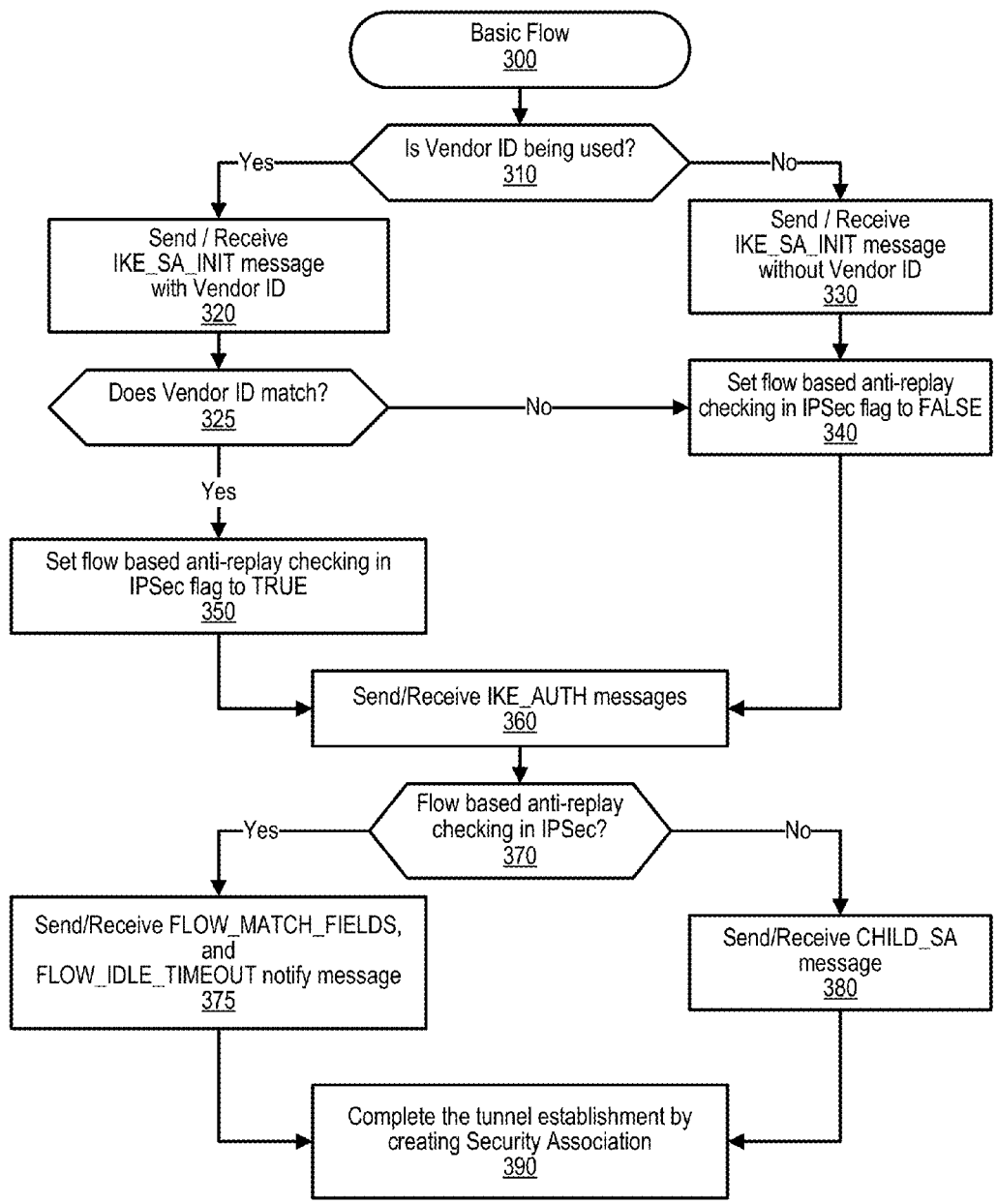
FIG. 3 is a diagram depicting one example of a the basic flow between the sender and the receiver to establish a secured tunnel that provides a sliding window context for each packet flow.

FIG. 3 is a diagram depicting one example of a basic flow between the sender and the receiver to establish a secured tunnel that provides a sliding window context for each packet flow. FIG. 3 commences at 300 and shows the steps taken by a process that performs the anti-replay checking using a flow-based sequence context. The process determines whether flow-based anti-replay checking is being used (decision 310). In one embodiment, the Vendor ID field in the packet is used to convey an indicator of the usage of flow-based anti-replay checking. If flow-based anti-replay checking is being used, then decision 310 branches to the 'yes' branch to perform step 320. On the other hand, if flow-based anti-replay checking is not being used, then decision 310 branches to the 'no' branch to perform step 330. At step 320, the process sends or receives the protocol initialization (INIT) message and includes the Vendor ID or other indicator that this system is using flow-based anti-replay checking. The process determines whether the Vendor IDs, or whatever field is being used to convey usage of flow-based anti-replay checking, matches between the initiator and the responder (decision 325). If the Vendor IDs, or whatever field is being used to convey usage of flow-based anti-replay checking, match, then decision 325 branches to the 'yes' branch to commence use of the flow-based anti-replay checking. On the other hand, if the Vendor IDs, or whatever field is being used to convey usage of flow-based anti-replay checking, do not match, then decision 325 branches to the 'no' branch to perform step 340. At step 330, the process sends and/or receives the initialization (INIT) message without a Vendor ID or without whatever field is used to convey usage of the flow-based anti-replay checking. At step 340, the process sets the flow-based anti-replay checking in the IP security (IPSec) flag to FALSE, indicating that flow-based anti-replay checking is not being used in this tunneling session. If the Vendor IDs match, then decision 325 branches to the 'yes' branch whereupon, at step 350, the process sets the flow-based anti-replay checking in the IP security (IPSec) flag to TRUE, indicating that flow-based anti-replay checking is being used in this tunneling session At step 360, the process send and/or receives Internet key authentication messages.

The process determines whether flow-based anti-replay checking in IPSec is being used in this tunneling session (decision 370) (e.g., by checking the IPSec flag set at 350). If flow-based anti-replay checking in IPSec is being used in this tunneling session, then decision 370 branches to the 'yes' branch whereupon, at step 375, the process sends or receives the flow match fields and the flow idle timeout notification message. This notifies the other party of the fields used to identify a flow. On the other hand, if flow-based anti-replay checking in IPSec is not being used in this tunneling session, then decision 370 branches to the 'no' branch whereupon, at step 380, a standard child security association message is sent. At step 390, the process completes the establishment of the tunneling session by creating a security association using the data provided. The tunneling session may or may not support the flow-based anti-replay checking depending on the negotiations that were performed between the sender and the receiver.

Figure 4:
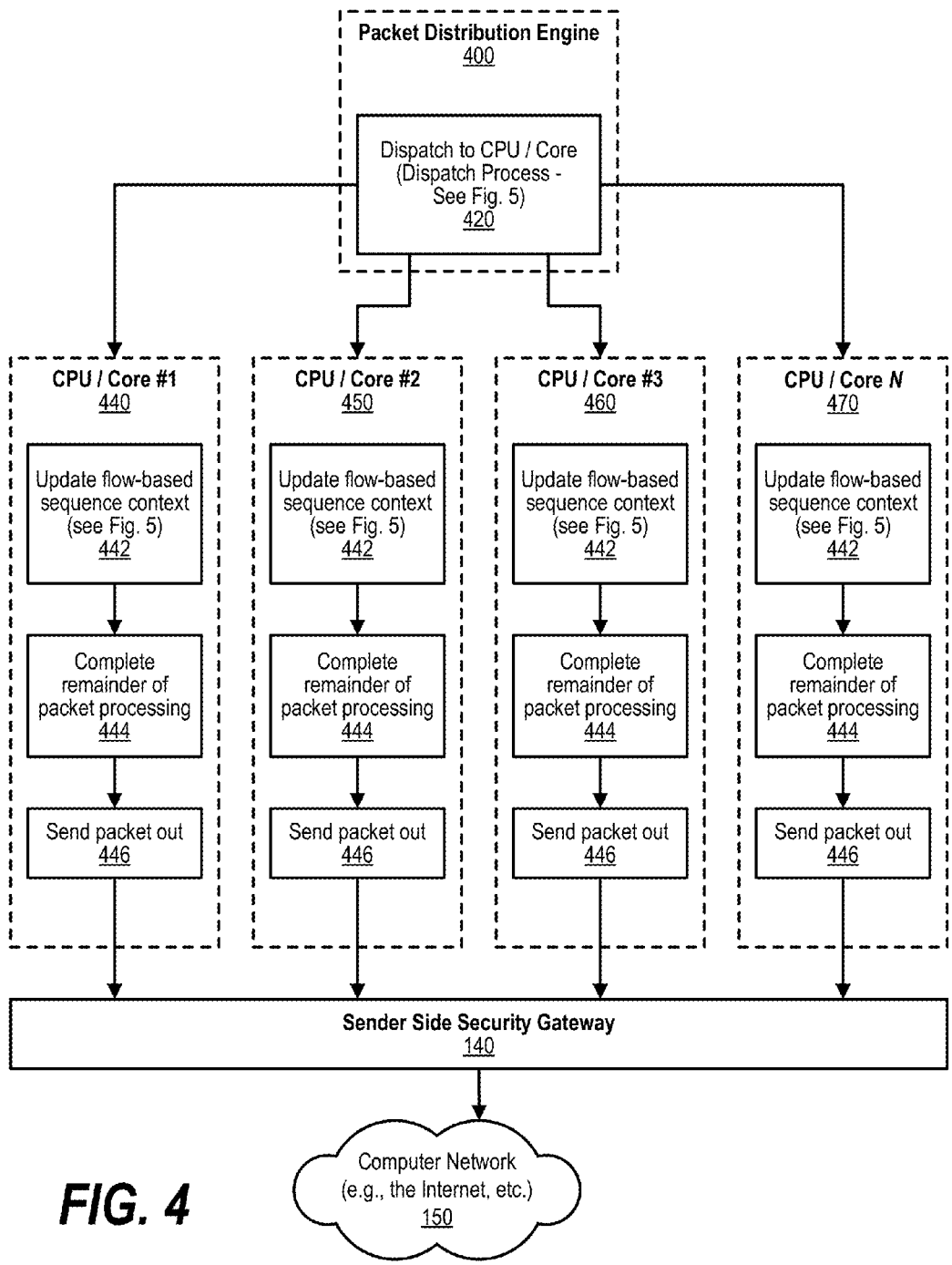
FIG. 4 is a diagram depicting one example of a flowchart of a packet distribution engine performed by the sender to dispatch packets using different cores in a multi-core processor by using the sliding window context for each flow.
Figure 5:
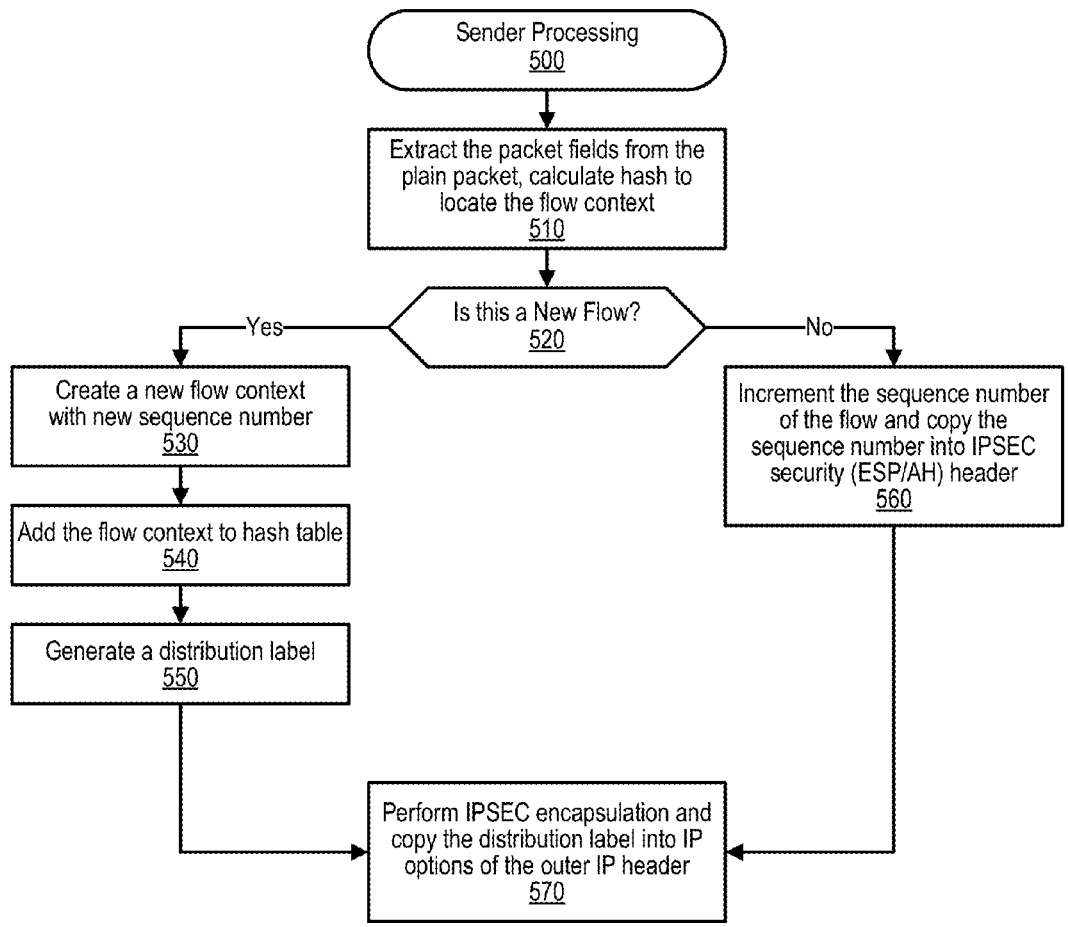
FIG. 5 is a diagram depicting one example of a flowchart showing steps taken by each core that is used to send secure packets across the secured tunnel.

FIG. 4 is a diagram depicting one example of a flowchart of a packet distribution engine performed by the sender to dispatch packets using different cores in a multi-core processor by using the sliding window context for each flow and high-level processing performed by each core. Packet distribution engine 400 receives data for transmission to a receiver that is connected to the other end of the tunneling session established using the process shown in FIG. 3. When the tunneling session has been established to utilize the flow-based sequence context to prevent a replay attack, then packet distribution engine 400 can dispatch the packet to the core that is managing the particular flow. FIG. 5 depicts one example of a flowchart showing steps taken by the dispatcher to dispatch the packet to the core that is handling the flow. Using the process shown in FIG. 5, the dispatcher determines which of the cores in the multi-core system is managing the flow to which the packet belongs. If the packet is to a new flow, then the dispatcher assigns the new flow to one of the cores.

Core #1 through core N (cores 440, 450, 460, and 470) represent the various cores in the multi-core system. The dispatcher sends the packet data to the core that is managing the flow. When a core receives a packet to process, the core performs steps 442 through 446. At step 442, the core updates the flow-based sequence context that is maintained by the core. The flow-based sequence context includes the flow-based sequence number. The flow-based sequence context is written to a memory accessible by the core. At step 444, the core completes the remainder of the packet processing and, at step 446, the core sends the packet out through sender side security gateway 140. The packet is encrypted and transmitted over the established tunneling session to the receiver. As shown in FIG. 5, the packet data includes a distribution label that includes flow-based sequence context as well as flow context data that allows the receiver to direct the packet to the receiver-side core that is managing the flow.

FIG. 5 is a diagram depicting one example of a flowchart showing steps taken by each core that is used to send secure packets across the secured tunnel. Processing by the dispatcher commences at 500 whereupon, at step 510, the dispatcher extracts packet fields from the plain packet and calculates a hash value to locate the flow context. A decision is made by the dispatcher as to whether the flow indicated by the hash value is a new flow (decision 520). In one embodiment, a hash lookup table of hash values of existing flows is checked and, if the hash value is not in the lookup table, then the packet is the first packet for a new flow. If the flow is a new flow, then decision 520 branches to the 'yes' branch whereupon, at step 530, the dispatcher creates a new flow context with a new, or initialized, flow-based sequence number. At step 540, the new flow context is added to the hash table. At step 550, a distribution label is generated. In one embodiment, a new IP option of an outer IP header is used to carry the distribution label to the receiver.

Returning to decision 520, if the flow is not a new flow but is a flow that was already present in the hash table, then decision 520 branches to the 'no' branch whereupon, at step 560, the flow-based sequence number is incremented and the process copies the flow-based sequence number into IPSEC security (ESP/AH) header.

At step 570, the sender performs IPSEC encapsulation and copies the distribution label into IP options of the outer IP header. The distribution label being in the outer IP header allows the receiver to both detect that the incoming packet includes a flow-based sequence context as well as flow context data that allows the receiver to direct the packet to the receiver-side core that is managing the flow.

Figure 6:
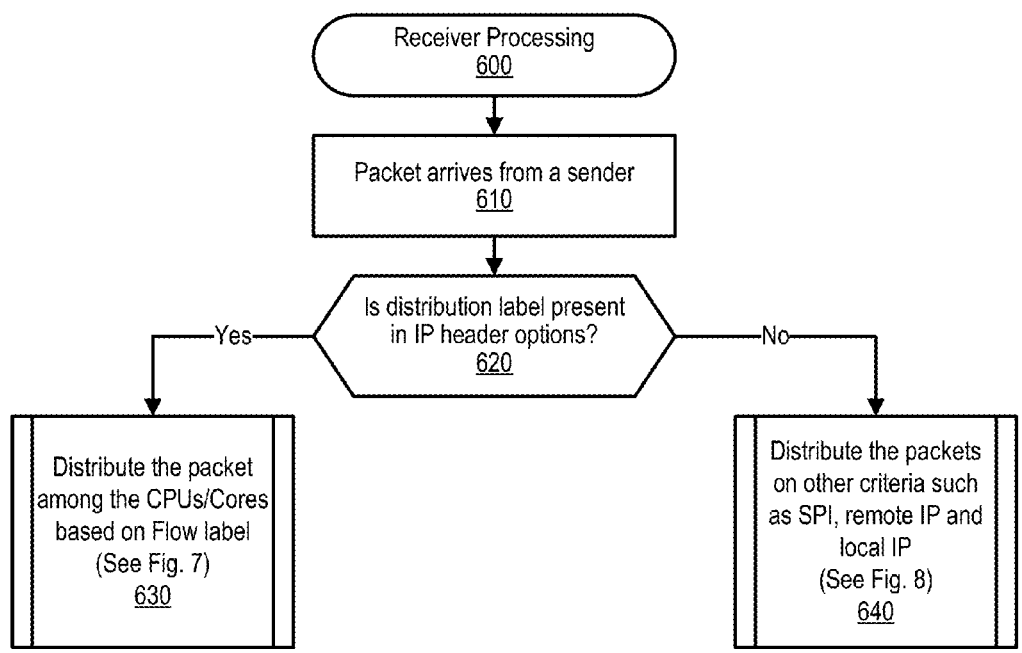
FIG. 6 is a diagram depicting one example of a flowchart showing steps taken by a receiver that receives packets from a sender that utilized multiple cores to send the packets using the sliding window context for each packet flow.

FIG. 6 is a diagram depicting one example of a flowchart showing steps taken by a receiver that receives packets from a sender that utilized multiple cores to send the packets using the sliding window context for each packet flow. Processing commences at 600 whereupon, at step 610, the receiver receives a packet from a sender with the packet being transmitted over the IPSec tunnel that was previously established between the sender and the receiver through the negotiation process shown in FIGS. 2 and 3.

A decision is made by the receiving process as to whether a distribution label is present in the received packet, such as in the IP header options (decision 620). If a distribution label was provided by the sender and is present in the received packet, then decision 620 branches to the 'yes' branch whereupon predefined process 630 is performed to distribute the packet among the receiver's cores based on the flow label included in the distribution label (see FIG. 7 and corresponding text for processing details). On the other hand, if a distribution label is not found, then decision 620 branches to the 'no' branch whereupon predefined process 640 is performed to distribute the packet based on other criteria such as fields within the packet that will remain unchanged during the life of the flow upon which the packet was transmitted (see FIG. 8 and corresponding text for processing details). For example, the IP addresses (local and remote) and the Security Parameters Index (SPI) are packet header fields that can be used to identify the flow.

Figure 7:
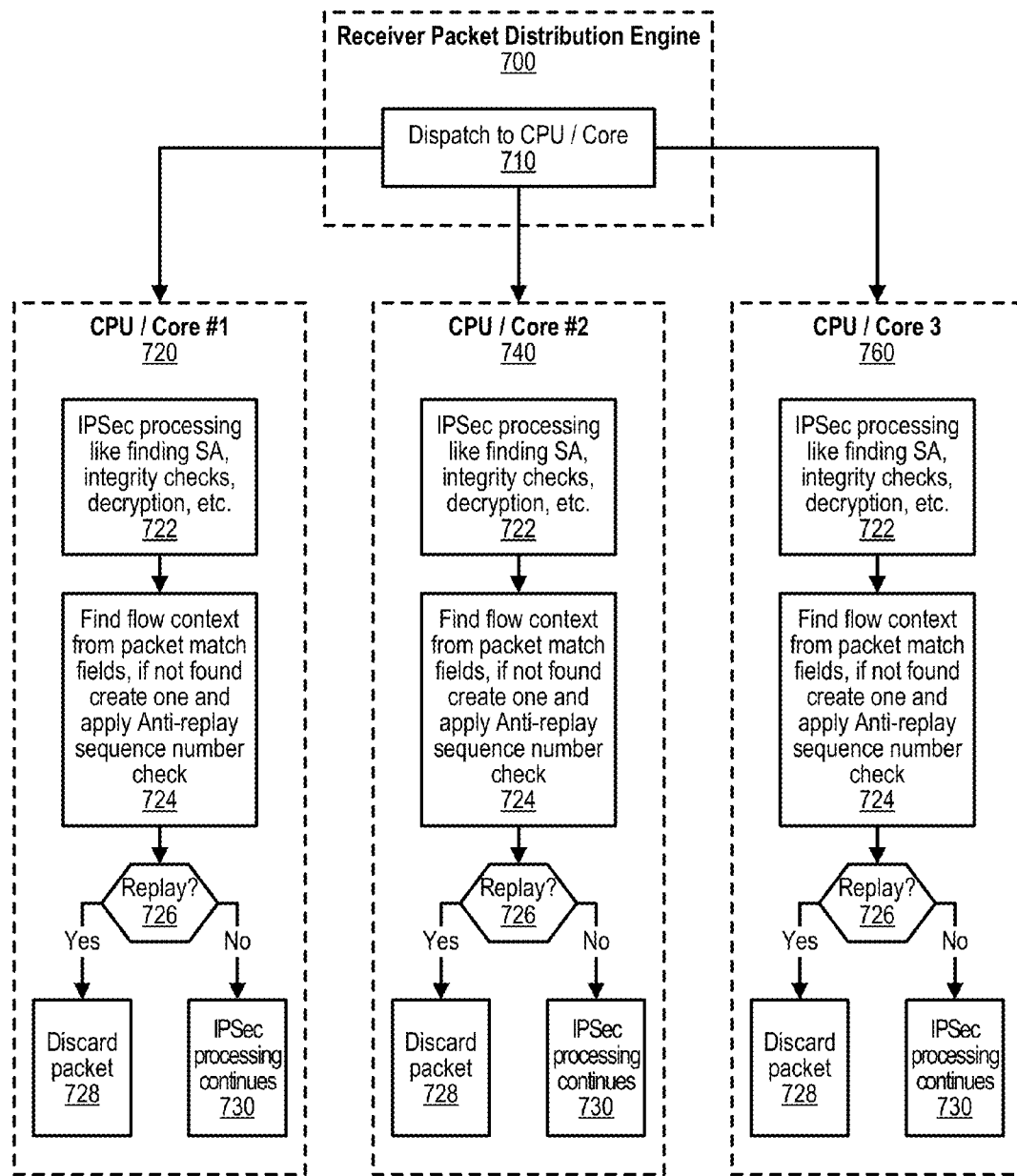
FIG. 7 a diagram depicting one example of a flowchart showing processing performed by the receiver's packet distribution engine to dispatch received packets to various cores included in the receiver's multi-core processor based on a distribution label associated with the packet.

FIG. 7 a diagram depicting one example of a flowchart showing processing performed by the receiver's packet distribution engine to dispatch received packets to various cores included in the receiver's multi-core processor based on a distribution label associated with the packet. Receiver packet distribution engine 700 includes dispatcher 710 that dispatches packets to the appropriate core based on the data in the distribution label that was found in the received packet. In the example, three cores are shown (cores 720, 730, and 740), however, any number of cores might be used based on the particular processor installed in the receiver's system. The approach allows the dispatcher to broadcast packets to the various cores based on the flow-context included in the packets, rather than utilize a single core for all packets traversing on the tunnel as found in traditional implementations.

At step 722, the assigned core performs IP security processing such as finding the security associations (SA) performing integrity checks, performing any needed decryption, etc. At step 724, the assigned core finds a flow context from the packet match fields. If a flow context is not found, signifying a new flow, a new flow context is created from the packet match fields. In one embodiment, a memory table is used to store the sequence number corresponding to the flow. A check is made as to whether the flow-based sequence number included in the received packet falls within the sliding window contexts for the identified flow. A sliding window context may be used instead of a strict sequence number check to accommodate packets that arrive somewhat out of order (see FIG. 1, flow 180, for an example). A decision is made by the core as to whether the flow-based sequence context is a replay attack by comparing the sliding flow-based sequence context maintained by the core to the flow-based sequence number found in the received packet (decision 726). If a replay attack is detected, then decision 726 branches to the 'yes' branch whereupon, at step 728, the core discards the packet. On the other hand, if a replay attack is not detected, then decision 726 branches to the 'no' branch whereupon, at step 730, IP security and other processing of the packet is performed.

Figure 8:
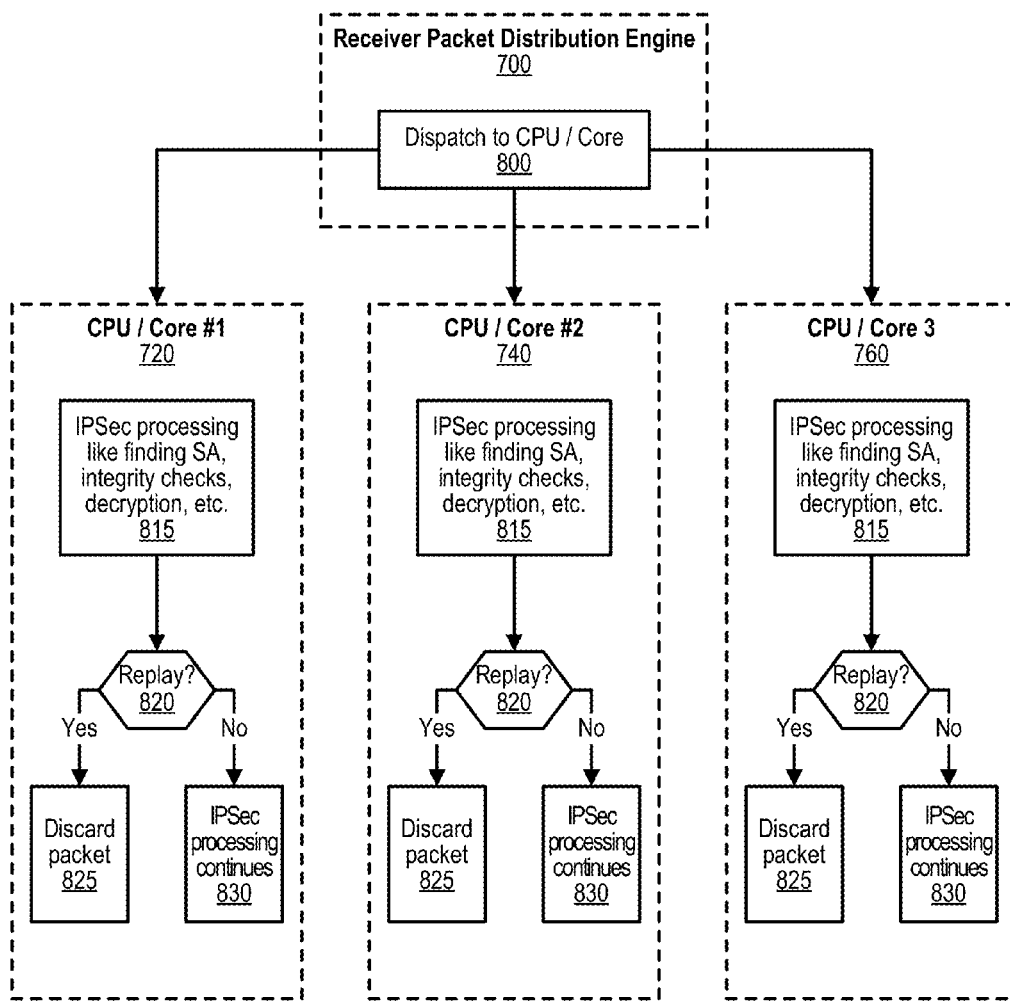
FIG. 8 is a diagram depicting one example of a flowchart showing processing performed by the receiver's packet distribution engine to dispatch received packets to various cores included in the receiver's multi-core processor using non-distribution label criteria.

FIG. 8 is a diagram depicting another example of a flowchart showing processing performed by the receiver's packet distribution engine to dispatch received packets to various cores included in the receiver's multi-core processor using non-distribution label criteria. Receiver packet distribution engine 700 includes dispatcher 800 that dispatches packets to the appropriate core based criteria other than a distribution label because a distribution label was not found in the received packet. In the example, three cores are shown (cores 720, 730, and 740), however, any number of cores might be used based on the particular processor installed in the receiver's system. Because a flow-based sequence context, as would be found in a distribution label, was not included in the incoming packet, the packet is processed without utilizing flow-based sequence context and without flow-based replay checking. Instead, as in traditional implementations, the sequence numbers found in the packet are tunnel-based, rather than flow-based, sequence numbers. In other words, if flow-based sequence context data is not found in the packet, then an alternative operating mode is used rather than the flow-based mode described herein. In the alternative operating mode, the sequence numbers found in the packet are tunnel-based rather than flow based.

At step 815, the assigned core performs IP security processing such as finding the security associations (SA) performing integrity checks, performing any needed decryption, etc. In one embodiment, the assigned core processes all of the flows for the tunnel because once a core is aware of the sequence numbers being used in a tunnel session that same core is used to maintain the sequence numbering and check for possible replay attacks. When subsequent flows are received for this tunnel session, the dispatcher will dispatch the subsequent flows to the assigned core. Unlike the broadcasting performed by the dispatcher as shown in FIG. 7, here the dispatcher is unable to broadcast flows to various cores for a given tunnel session. A decision is made by the core as to whether a replay attack is being attempted by checking the tunnel-based sequence number included in the packet (decision 820). If a replay attack is detected, then decision 820 branches to the 'yes' branch and the packet is discarded at step 825. On the other hand, if a replay attack is not detected, then decision 820 branches to the 'no' branch whereupon, at step 830, IP security and other processing of the packet is performed.

Figure 9:
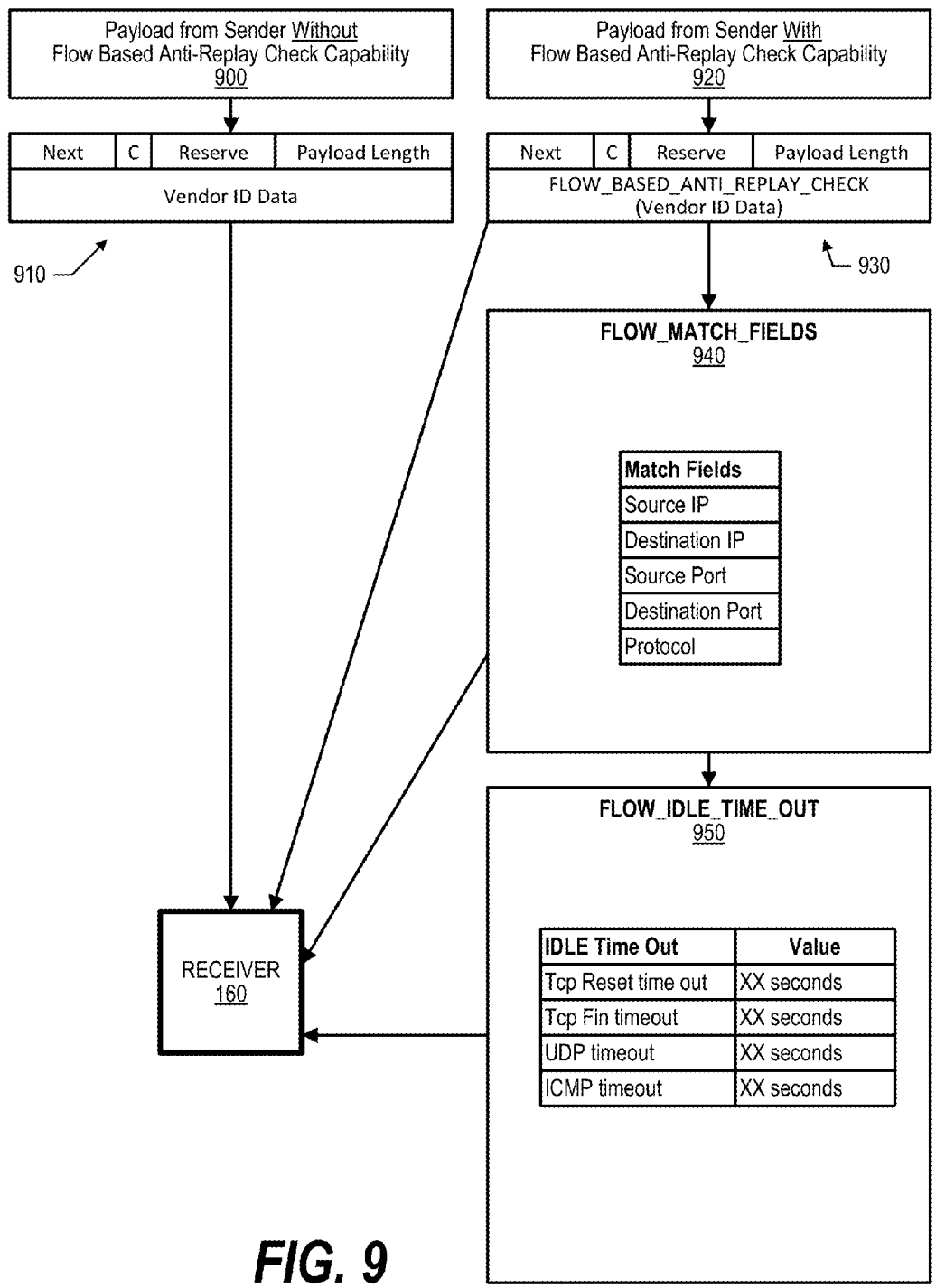
FIG. 9 is a diagram depicting examples of two payloads—one payload that does not include flow based anti-replay check capability and another payload that includes the flow based anti-replay check capability.

FIG. 9 is a diagram depicting examples of two tunnel packet payloads—one payload that does not include flow based anti-replay check capability and another payload that includes the flow based anti-replay check capability. Packet 900 represents a payload sent from a sender after negotiation with the receiver without flow-based anti-replay check capability. Data depiction 910 shows the Vendor ID field either being blank or filled with vender identification data and not containing flow-based anti-replay check data.

On the other hand, packet 920 represents a payload sent from a sender after negotiation with the receiver with flow-based anti-replay check capability used in the tunnel session established between the sender and the receiver. Data depiction 930 shows the Vendor ID field being used to convey the flow-based anti-replay check data. The flow-based anti-replay check data includes both flow match fields as well as flow idle time out data. In the example shown, flow match fields 940 are shown as being the Source IP, the Destination IP, the Source Port, the Destination Port, and the Protocol. Different flow match fields can be used and can also be based on fields agreed upon by the sender and the receiver through the negotiation process used to establish the tunnel session. The flow match fields are embedded during the CHILD_SA negotiations and it is initiated by the sender to notify the receiver about the match fields to be used to locate a flow context. In one embodiment, the receiver either responds back with the same match fields or subset of those match fields to use to locate a flow context. Flow idle time out data 950 is also sent during the CHILD_SA negotiations and is initiated by the sender to notify the receiver about the flow idle timeouts. Flow timeout is used to cleanup the flow context at the receiver. Flow timeouts may be different for each protocol, such as TCP and UDP. In one embodiment, each application specific idle timeout is represented as TLV format and encoded in the notify data.

Figure 10:
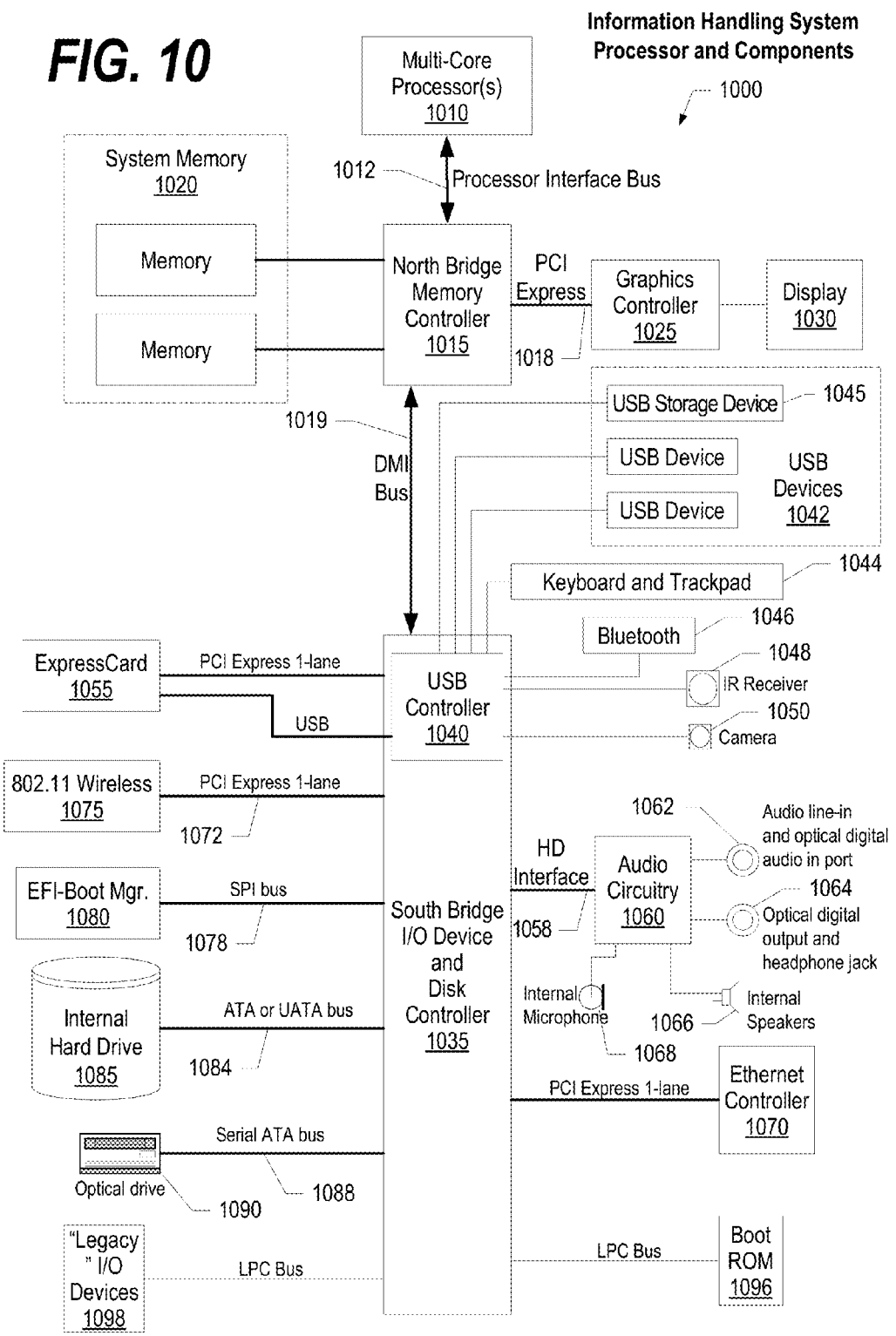
FIG. 10 is a block diagram of a data processing system in which the methods described herein can be implemented.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display circuit element object 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth circuit element objects, such as boot ROM 1096 and "legacy" I/O circuit element objects (using a "super I/O" chip). The "legacy" I/O circuit element objects (1198) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage circuit element object controller, which connects Southbridge 1035 to nonvolatile storage circuit element object 1085, such as a hard disk drive, using bus 1084.

ExpressCard 1055 is a slot that connects hot-pluggable circuit element objects to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to circuit element objects that connect to the USB. These circuit element objects include webcam (camera) 1050, infrared (IR) receiver 1048, keyboard and trackpad 1044, and Bluetooth circuit element object 1046, which provides for wireless personal area networks (PANs). USB Controller 1040 also provides USB connectivity to other miscellaneous USB connected circuit element objects 1042, such as a mouse, removable nonvolatile storage circuit element object 1045, modems, network cards, ISDN connectors, fax, printers, USB hubs, and many other types of USB connected circuit element objects. While removable nonvolatile storage circuit element object 1045 is shown as a USB-connected circuit element object, removable nonvolatile storage circuit element object 1045 could be connected using a different interface, such as a Firewire interface, etcetera.

Wireless Local Area Network (LAN) circuit element object 1075 connects to Southbridge 1035 via the PCI or PCI Express bus 1072. LAN circuit element object 1075 typically implements one of the IEEE 802.11 standards of over-the-air modulation techniques that all use the same protocol to wireless communicate between information handling system 1000 and another computer system or circuit element object. Optical storage circuit element object 1090 connects to Southbridge 1035 using Serial ATA (SATA) bus 1088. Serial ATA adapters and circuit element objects communicate over a high-speed serial link. The Serial ATA bus also connects Southbridge 1035 to other forms of storage circuit element objects, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming circuit element object, ATM machine, a portable telephone circuit element object, a communication circuit element object or other circuit element objects that include a processor and memory.

The Trusted Platform Module (TPM 1095) shown in FIG. 10 and described herein to provide security functions is but one example of a hardware security module (HSM). Therefore, the TPM described and claimed herein includes any type of HSM including, but not limited to, hardware security circuit element objects that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 11.

Figure 11:
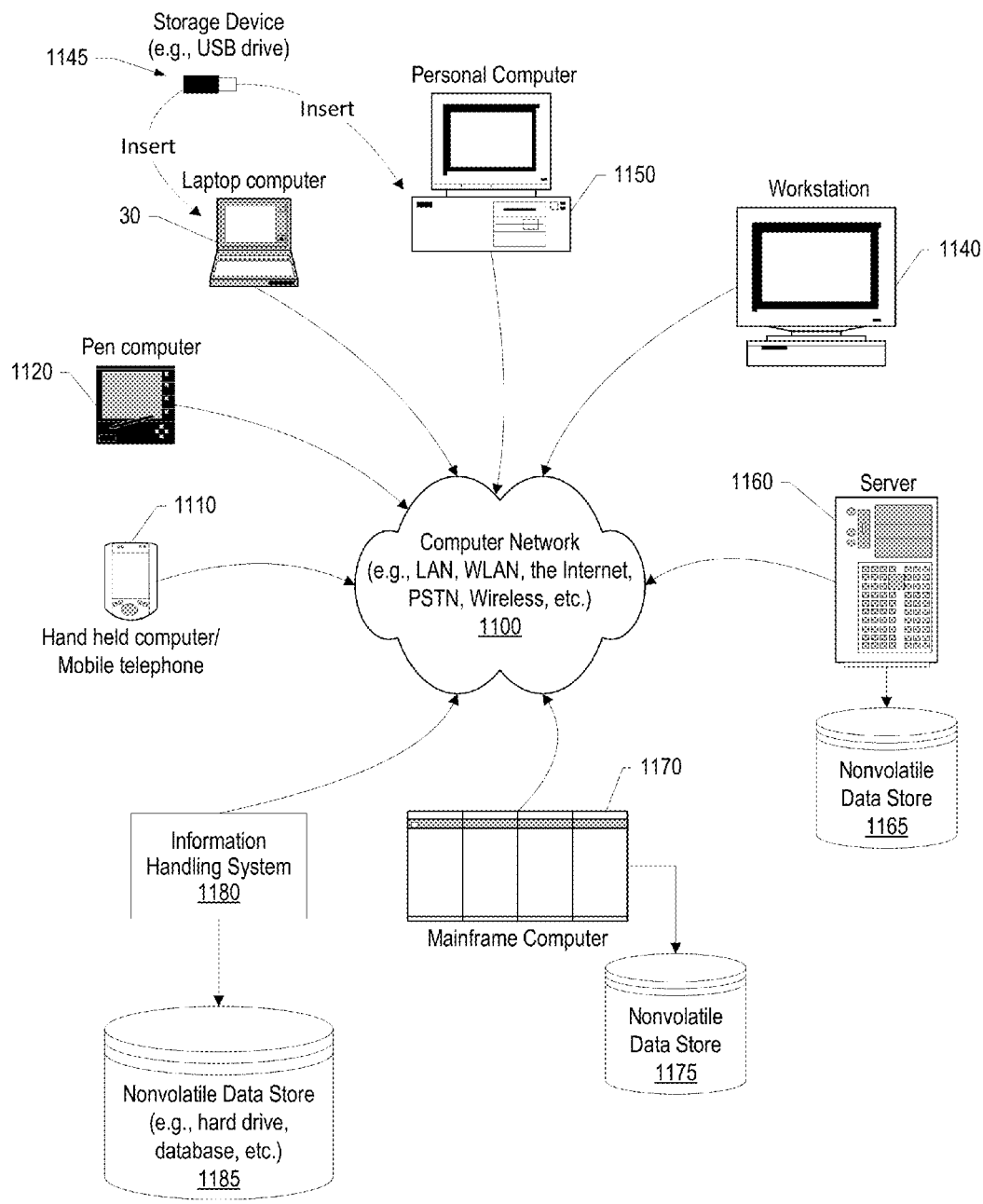
FIG. 11 provides an extension of the information handling system environment shown in FIG. 10 to illustrate that the methods described herein can be performed on a wide variety of information handling systems which operate in a networked environment.

FIG. 11 provides an extension of the information handling system environment shown in FIG. 10 to illustrate that the methods described herein can be performed on a wide variety of information handling systems that operate in a networked environment. Types of information handling systems range from small handheld circuit element objects, such as handheld computer/mobile telephone 1110 to large mainframe systems, such as mainframe computer 1170. Examples of handheld computer 1110 include personal digital assistants (PDAs), personal entertainment circuit element objects, such as MP3 players, portable televisions, and compact disc players. Other examples of information handling systems include pen, or tablet, computer 1120, laptop, or notebook, computer 1130, workstation 1140, personal computer system 1150, and server 1160. Other types of information handling systems that are not individually shown in FIG. 11 are represented by information handling system 1180. As shown, the various information handling systems can be networked together using computer network 1100. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 11 depicts separate nonvolatile data stores (server 1160 utilizes nonvolatile data store 1165, mainframe computer 1170 utilizes nonvolatile data store 1175, and information handling system 1180 utilizes nonvolatile data store 1185). The nonvolatile data store can be a component that is external to the various information handling systems or can be internal to one of the information handling systems. In addition, removable nonvolatile storage circuit element object 1145 can be shared among two or more information handling systems using various techniques, such as connecting the removable non-volatile storage circuit element object 1145 to a USB port or other connector of the information handling systems.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system."

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other circuit element objects to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other circuit element objects to cause a series of operational steps to be performed on the computer, other programmable apparatus or other circuit element objects to produce a computer implemented process such that the instructions which execute on the computer or other programmable apparatus provide processes for implementing the functions/acts specified in the flowchart and/or block diagram block or blocks.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method of managing a tunneling protocol using a multi-core processor, the method comprising:
    establishing a tunneling session at a multi-core processor, wherein the multi-core processor has a plurality of processing cores, and wherein a plurality of flows are transmitted over the established tunneling session;
    assigning a first of the plurality of cores to manage a first flow from the plurality of flows and assigning a second of the plurality of cores to manage a second flow from the plurality of flows;
    maintaining a flow-based sequence context at each of the plurality of flows, wherein each flow-based sequence context is maintained by the core that is managing the respective flow;
    receiving a data packet, wherein the data packet is a first data packet from a received flow of the plurality of flows;

determining whether the data packet includes one of the flow-based sequence contexts;
in response to said determining that the data packet includes one of the flow-based sequence contexts, assigning one of the plurality of cores based on data in the data packet and dispatching the received data packet to the assigned core;
receiving one or more subsequent data packets, wherein each of the subsequent data packets are from the received flow;
dispatching each of the subsequent data packets to the assigned core;
determining whether each of the subsequent data packets is a replay attack attempt by checking a flow-based sequence number included in the flow-based sequence context; and
discarding one or more of the subsequent packets in response to detecting the replay attack in the one or more of the subsequent packets.

2. The method of claim 1 further comprising:
negotiating use of the flow-based sequence context between the multi-core processor and another system accessible via a computer network.

3. The method of claim 1 wherein the first core is managing a transmission of a second data packet over the first flow, the method further comprising:
checking as to whether the second data packet is a new data packet; and
in response to the second data packet being new:
adding a new flow-based sequence context to the second data packet, wherein the new flow-based sequence context includes a flow-based sequence number.

4. The method of claim 3 wherein, in response to the second data packet being new, the method further comprises:
adding a packet identifier to a memory table accessible to the first core;
transmitting the second data packet over a computer network to a receiver.

5. The method of claim 4 further comprising:
prior to the transmitting:
generating a distribution label corresponding to the second data packet; and
performing an encryption encapsulation of the second data packet, wherein the distribution label is included in a set of header data corresponding to the second data packet.

6. The method of claim 3 further comprising:
in response to the second data packet already existing:
modifying the flow-based sequence context of the second data packet, wherein the modifying comprises incrementing the flow-based sequence number; and
transmitting the second data packet over a computer network to a receiver.

7. The method of claim 6 further comprising:
prior to the transmitting:
performing an encryption encapsulation of the second data packet, wherein a distribution label is included in a set of header data corresponding to the second data packet.

8. A information handling system comprising:
a multi-core processor, wherein the multi-core processor has a plurality of processing cores;
a security module that establishes a tunneling session at the multi-core processor, wherein a plurality of flows are transmitted over the established tunneling session;
a distribution engine configured to:
assign a first core of the plurality of cores to manage a first flow from the plurality of flows and assigning a second core of the plurality of cores to manage a second flow from the plurality of flows,
maintaining a flow-based sequence context at each of the plurality of flows, wherein the flow-based sequence context is maintained by the core that is managing the respective flow,
receive a data packet, wherein the data packet is a first data packet from a received flow of the plurality of flows,
determine whether the data packet includes one of the flow-based contexts,
in response to said determining that the data packet includes one of the flow-based sequence contexts, assign one of the plurality of cores based on data in the data packet and dispatch the data packet to the assigned core,
receive one or more subsequent data packets, wherein each of the subsequent data packets are from the received flow,
dispatch each of the subsequent data packets to the assigned core,
determine whether each of the subsequent data packets is a replay attack attempt based on a flow-based sequence number included in the flow-based sequence context, and
discard one or more of the subsequent packets in response to detection of the replay attack in the one or more of the subsequent packets.

9. The information handling system of claim 8 wherein the security module negotiates use of the flow-based sequence context between the multi-core processor and another system accessible via a computer network prior to the establishment of the tunneling session.

10. The information handling system of claim 8 wherein the first core manages a transmission of a second data packet over the first flow, and wherein the distribution engine is further comprised to:
check as to whether the second data packet is a new data packet;
select the first core as the core to manage the new data packet based on data in the new data packet; and
dispatch the new data packet to the selected first core.

11. The information handling system of claim 10 wherein, in response to the second data packet being new, the first core is further comprised to:
add a new flow-based sequence context to the second data packet, wherein the new flow-based sequence context includes a flow-based sequence number; and
transmit the second data packet over a computer network to a receiver.

12. The information handling system of claim 11 further comprising having the first core, prior to the transmission of the data packet, configured to:
generate a distribution label corresponding to the second data packet; and
perform an encryption encapsulation of the second data packet, wherein the distribution label is included in a set of header data corresponding to the second data packet.

13. The information handling system of claim 10 wherein, in response to the second data packet already existing, the first core is further comprised to:

modify the flow-based sequence context of the second data packet by incrementing the flow-based sequence number; and transmit the second data packet over a computer network to a receiver.

14. The information handling system of claim 13 wherein, prior to the transmission of the second data packet, the first core is further comprised to:

perform an encryption encapsulation of the second data packet, wherein a distribution label is included in a set of header data corresponding to the second data packet.

15. A computer program product comprising a computer readable storage medium comprising a set of computer instructions, the computer instructions effective to:

establish a tunneling session at a multi-core processor, wherein the multi-core processor has a plurality of processing cores, and wherein a plurality of flows are transmitted over the established tunneling session;

assign a first of the plurality of cores to manage a first flow from the plurality of flows and assigning a second of the plurality of cores to manage a second flow from the plurality of flows; and maintain a flow-based sequence context at each of the plurality of flows, wherein the flow-based sequence context is maintained by the core that is managing the respective flow;

receive the data packet, wherein the data packet is a first data packet from a first flow of the plurality of flows;

determine whether the data packet includes the flow-based sequence context;

in response to detecting the flow-based sequence context:
assign one of the plurality of cores based on data in the data packet; and
dispatch the received data packet to the assigned core;

receive a plurality of subsequent data packets, wherein each of the subsequent data packets are from the first flow;

dispatch each of the subsequent data packets to the assigned core;

determine whether each of the subsequent data packets is a replay attack attempt by checking a flow-based sequence number included in the flow-based sequence context; and discarding one or more of the subsequent packets in response to detecting the replay attack in the one or more of the subsequent packets.

* * * * *